United States Patent
Shimizu

(10) Patent No.: US 9,030,705 B2
(45) Date of Patent: May 12, 2015

(54) PRINTING CONTROL APPARATUS AND PRINTING CONTROL METHOD

(75) Inventor: Yasushi Shimizu, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 13/566,832

(22) Filed: Aug. 3, 2012

(65) Prior Publication Data

US 2013/0057922 A1 Mar. 7, 2013

(30) Foreign Application Priority Data

Sep. 5, 2011 (JP) ................................ 2011-193028

(51) Int. Cl.
*G06F 15/00* (2006.01)
*G06F 3/12* (2006.01)
*G06K 1/12* (2006.01)
*G06K 15/02* (2006.01)

(52) U.S. Cl.
CPC ............ *G06F 3/1203* (2013.01); *G06F 3/1222* (2013.01); *G06F 3/1238* (2013.01); *G06F 3/1242* (2013.01); *G06F 3/125* (2013.01); *G06F 3/1273* (2013.01); *G06F 3/1279* (2013.01); *G06K 1/121* (2013.01); *G06K 15/1868* (2013.01)

(58) Field of Classification Search
USPC ............................................... 358/1.18
See application file for complete search history.

(56) References Cited

U.S. PATENT DOCUMENTS 6,529,288 B1 * 3/2003 Miyazaki ..................... 358/1.16
2010/0157326 A1 * 6/2010 Mori ............................. 358/1.5

FOREIGN PATENT DOCUMENTS

CN 101646000 A 2/2010
JP 2009-272796 A 11/2009

* cited by examiner

*Primary Examiner* — Saeid Ebrahimi Dehkordy
(74) *Attorney, Agent, or Firm* — Canon U.S.A., Inc., IP Division

(57) ABSTRACT

A printing control method includes obtaining a size of a sheet to be used for printing, determining a size of a post-trimming sheet according to the obtained sheet size, specifying a print position of barcode information according to the determined sheet size, and controlling the barcode information to be printed in the specified position.

6 Claims, 7 Drawing Sheets

FIG.3

| NO. | RECORDING SHEET SIZE | HEIGHT | WIDTH | POST-PROCESSING RECORDING SHEET SIZE | HEIGHT | WIDTH |
|---|---|---|---|---|---|---|
| 1 | A3 | 297 | 420 | B4 | 257 | 364 |
| 2 | A3 NOBI | 329 | 483 | A3 | 297 | 420 |
| 3 | 11×17 | 2974 | 4318 | Legal | 2159 | 3556 |
| 4 | 12×18 | 3048 | 4572 | 11×17 | 2974 | 4318 |
| 5 | 13×19 | 3302 | 4826 | 11×17 | 2974 | 4318 |
| 6 | USER DEFINITION 1 | 3000 | 4500 | A3 | 297 | 420 |
| 7 | USER DEFINITION 2 | 3200 | 5000 | 11×17 | 2974 | 4318 |

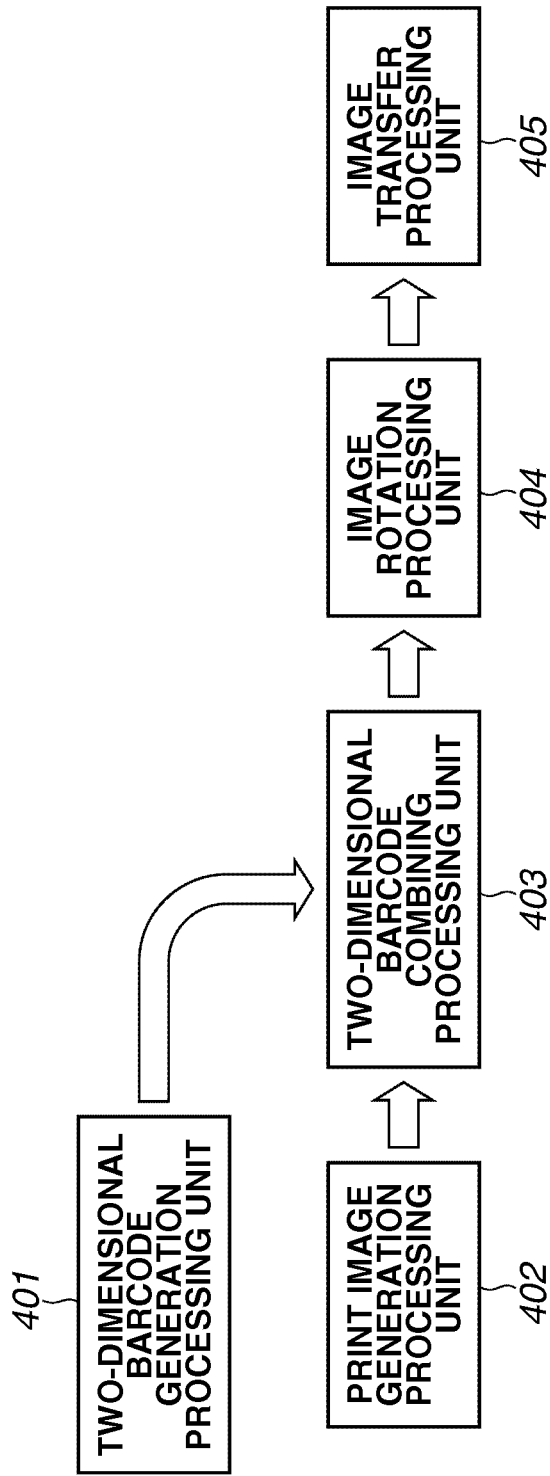

TWO-DIMENSIONAL BARCODE PRINT
POSITION BY POST-PROCESSING

TWO-DIMENSIONAL BARCODE PRINT
FAILURE BY POST-PROCESSING

TWO-DIMENSIONAL BARCODE CANNOT
BE READ AS IT IS CUT.
EVEN IF TWO-DIMENSIONAL BARCODE IS
NOT CUT, CHANGE IN DISTANCE FROM SHEET
EDGE INCREASES CODE DETECTION TIME.

FIG.6
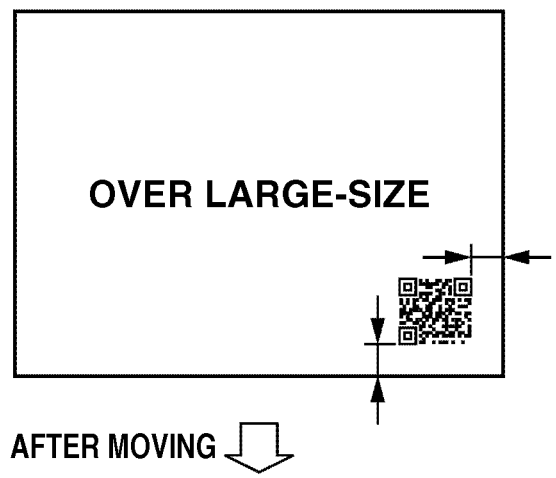
OVER LARGE-SIZE
AFTER MOVING ⬇
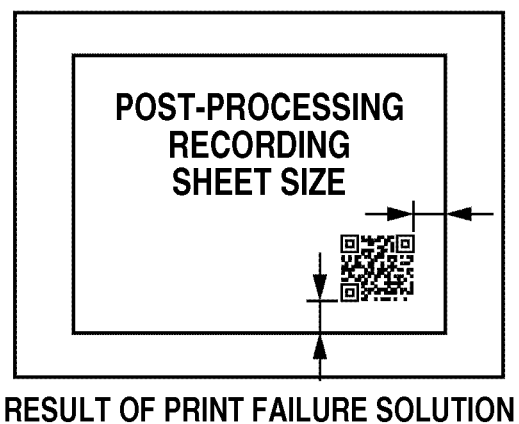
POST-PROCESSING
RECORDING
SHEET SIZE
RESULT OF PRINT FAILURE SOLUTION

PRINTING CONTROL APPARATUS AND PRINTING CONTROL METHOD

BACKGROUND OF THE INVENTION

1. Field of the Invention

The present invention relates to a printing control apparatus and a printing control method.

2. Description of the Related Art

A printing control apparatus discussed in Japanese Patent Application Laid-Open No. 2009-272796 causes a two-dimensional barcode to be embedded and printed on each of all four corners or any one corner of a print product, so that the print product with the embedded barcode is scanned as an original document, and the embedded information is read. The printing control apparatus restricts an image output operation such as a copy operation in response to the embedded information, or extracts tracking information from the embedded information. For example, the tracking information includes information of a user who executed an output operation, and information of execution date and time of the output operation.

According to such a printing control apparatus, the two-dimensional barcode is printed in a specific position at an end of a recording sheet, the specific position being determined beforehand. Such printing is expected to prevent the two-dimensional barcode from being overlapped on document information provided as original contents of the print document, and to enhance a barcode recognition rate by omitting time to search the entire document for a barcode at the time of reading.

For example, a Business Machine Linkage Service (BM-LinkS) (trademark) information marking standard specification version 1.0.0 defines a specification called a BMLinkS (trademark). In the BMLinkS (trademark) information marking standard specification version 1.0.0, a print position is strictly defined as "being arranged in any one of the four corners within 30 mm from respective sheet edge. ABM-IM mark should be written from a position at a distance of 10 mm from the edge.

Since the two-dimensional barcode is printed in the predetermined position at the end of the recording sheet, the advantages mentioned above are expected. However, there are cases where an end of a recording sheet is cut by trimming process after printing to cause missing barcode.

Particularly, when an image is printed centered on a recording sheet larger than a desired recording size, four sides of the recording sheet are usually cut in post-processing to provide a function of printing an image up to an end of a recording sheet such as full bleeding. If a two-dimensional barcode image goes missing due to cutting of an end of a recording sheet, the two-dimensional barcode is unlikely to be recognized when reading the recording sheet is performed. Moreover, even if the two-dimensional barcode does not go missing, time consumed after reading of a recording sheet before recognition of the two-dimensional barcode is likely to increase due to a change in a distance from an edge of the recording sheet to the two-dimensional barcode by cutting the recording sheet.

SUMMARY OF THE INVENTION

According to an aspect of the present invention, a printing control apparatus includes an obtaining unit configured to obtain a size of a sheet to be used for printing, a determining unit configured to determine a size of a post-trimming sheet according to the sheet size obtained by the obtaining unit, a specifying unit configured to specify a print position of barcode information according to the sheet size determined by the determining unit, and a control unit configured to control the barcode information to be printed in the position specified by the specifying unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of table information managed by the CPU according to the exemplary embodiment of the present invention.

FIG. 4 is a block diagram illustrating an example of an internal configuration of an image processing unit according to the exemplary embodiment of the present invention.

FIG. 6 illustrates an example output from the image output apparatus according to the exemplary embodiment of the present invention.

DESCRIPTION OF THE EMBODIMENTS

Various exemplary embodiments, features, and aspects of the invention will be described in detail below with reference to the drawings.

Figure 1:
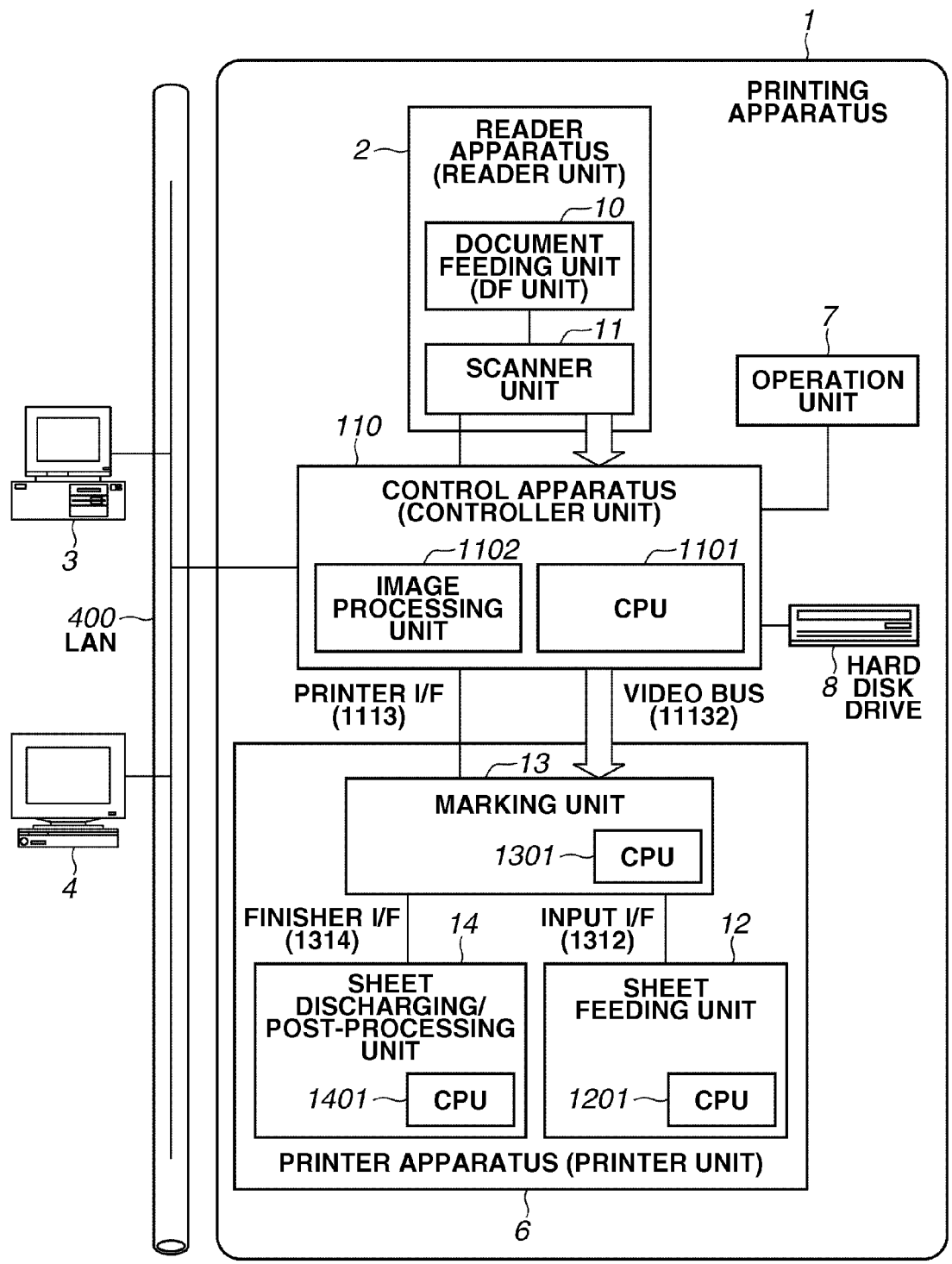
FIG. 1 is a block diagram illustrating a configuration of a printing apparatus according to an exemplary embodiment of the present invention.

FIG. 1 is a block diagram illustrating an example of a printing apparatus (data processing apparatus) including a controller unit provided as an electronic component according to a first exemplary embodiment of the present invention. A printing apparatus 1 according to the present exemplary embodiment is connected to a host computer (e.g., a first personal computer (PC) 3 and a second PC 4 in the present exemplary embodiment) via a local area network (LAN) 400 such as Ethernet.

The printing apparatus 1 includes a reader apparatus (reader unit) 2 for performing a reading process on image data, a printer apparatus (printer unit) 6 for performing an outputting process on the image data, and an operation unit 7 including a keyboard and a liquid crystal panel. The keyboard is used to input and output the image data, and the liquid crystal panel displays the image data and various functions thereon. The printing apparatus 1 also includes a control apparatus (controller unit) 110 to which a hard disk drive 8 is connected. The controller unit 110 is connected to and controls each of these components. The hard disk drive 8 has, for example, a control program and image data written beforehand. Moreover, the controller unit 110 includes a network controller (not illustrated) which connects the printing apparatus 1 to the LAN 400 to control communication of the printing apparatus 1 with an external device.

The reader unit 2 includes a document feeding unit (DF unit) 10 for conveying an original document and a scanner unit 11 for optically reading an original document to convert the original document into an image data as an electric signal. The printer unit 6 includes a sheet feeding unit 12, a marking unit 13, and a sheet discharging/post-processing unit 14. The sheet feeding unit 12 includes a sheet cassette having a plurality of stages storing recording sheets. The marking unit 13 transfers the image data to a recording sheet to fix the image date onto the recording sheet. The sheet discharging/post-processing unit 14 performs a sorting process, a stapling process, and a cutting process on a printed recording sheet to discharge the processed sheet outside.

The controller unit 110 includes a CPU 1101 for controlling thereof. The printer unit 6 has a CPU 1301 in the marking unit 13. The CPU 1301 controls the marking unit 13, and communicates with the sheet discharging/post-processing unit 14 and the sheet feeding unit 12. The CPU 1301 serves as a CPU for controlling the entire printer unit 6. The sheet discharging/post-processing unit 14 and the sheet feeding unit 12 respectively include a CPU 1401 and a CPU 1201 for controlling thereof. Each of the controller unit 110, the sheet feeding unit 12, the marking unit 13, and the sheet discharging/post-processing unit 14 includes a random access memory (RAM) (not illustrated) functioning as a work area of the CPU thereof, and a read only memory (ROM) (not illustrated) storing a program to be read by the CPU thereof.

The CPUs 1101 and 1301 communicate via a printer interface (I/F) 1113. The CPUs 1101 and 1301 also use a video bus 11132 for image transfer. The CPU 1301 of the marking unit 13 and the CPU 1401 of the sheet discharging/post-processing unit 14 communicate via a finisher I/F 1314. The CPU 1301 of the marking unit 13 and the CPU 1201 of the sheet feeding unit 12 communicate via an input I/F 1312.

The controller unit 110 includes an image processing unit 1102, so that an image combining process and an image process can be performed inside thereof. The image process includes gamma look up table (LUT) conversion suitable for an engine, and a half tone process. An image undergoes an image process in the image processing unit 1102 to be transferred to the marking unit 13 via the video bus 11132 so that the image can be printed as a visible image (combined pattern) on the recording sheet. The printing apparatus 1 executes a print job printing the image on the recording sheet based on the print data received from the external host computer, or a copy job printing a document image read by the reader unit 2 according to a print request from the operation unit 7 on a recording sheet.

Figure 2:
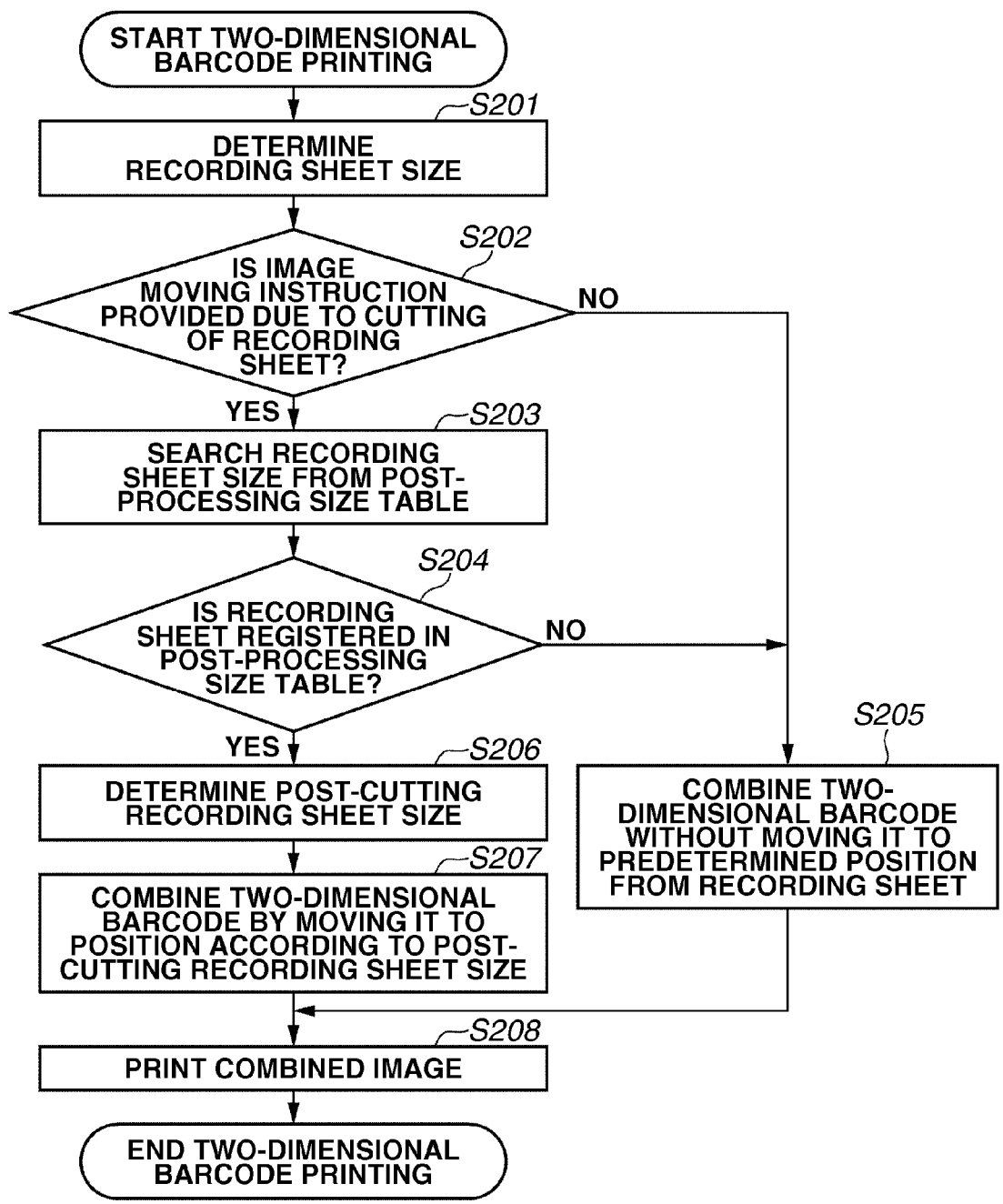
FIG. 2 is a flowchart illustrating an operation procedure of a central processing unit (CPU) according to the exemplary embodiment of the present invention.

Next, a procedure by the CPU 1101 of the controller unit 110, according to the present exemplary embodiment, will be described in detail with reference to a flowchart illustrated in FIG. 2. The CPU 1101 executes a process illustrated in FIG. 2 by reading and executing a program stored in the ROM. The CPU 1101 of the controller unit 110 receives the print request from, for example, the operation unit 7, the first PC 3, or the second PC 4 so that image data is combined with a two-dimensional barcode to be printed. Upon receipt of the print request, the CPU 1101 starts the process, and the operation proceeds to step S201. When the print request is received from the operation unit 7, the CPU 1101 causes the reader unit 2 to read a document to generate image data. When the print request is received from the first PC 3 or the second PC 4, the CPU 1101 receives print data with the print request to generate image data based on the received print data. The two-dimensional barcode is combined in an appropriate position for the image indicated by the image data acquired by each of these methods. An operation procedure for printing the image with the combined two-dimensional barcode will be described.

In step S201, the CPU 1101 determines a size of a recording sheet on which printing is to be executed. The size of the recording sheet on which an image is to be printed is designated by the operation unit 7, the first PC 3, or the second PC 4 at the time of the print request. If the sheet feeding unit 12 has a plurality of sheet feed stages, a user may designate a sheet feed stage storing recording sheets instead of designating a sheet size. Moreover, a size of the recording sheet on which the image to be printed may be determined by algorithm included in the controller unit 110. For example, the CPU 1101 selects a minimum standard recording sheet in which the document image fits according to the size of the document image requested for printing.

After the CPU 1101 determines the recording sheet size in step S201, the operation proceeds to step S202. In step S202, the CPU 1101 checks whether an image moving instruction is provided due to cutting, or trimming, of the recording sheet. The instruction is provided from the user at the time of the print request from the operation unit 7, the first PC 3, or the second PC 4. If there is not the moving instruction (NO in step S202), the operation proceeds to step S205. If there is the moving instruction (YES in step S202), the operation proceeds to step S203.

In steps S203, S204, and S206, the CPU 1101 determines a size of a post-cutting recording sheet based on the recording sheet size determined in step S201. In this case, the CPU 1101 determines the post-cutting recording sheet size using a table managed by the controller unit 110. In the table, sizes of recording sheets and sizes of post-cutting recording sheets are associated with each other beforehand. The table can be registered beforehand by the user from the operation unit 7, the first PC 3, or the second PC 4.

The registered information is stored in the hard disk drive 8 as a post-processing size table as illustrated in FIG. 3. In step S204, the CPU 1101 searches a post-cutting recording sheet size from the table based on a size of the recording sheet. In an example illustrated in FIG. 3, if the recording sheet size determined in step S201 is a first recording sheet size A3, a cutting size is set to a second recording sheet size B4 that is smaller than the first recording sheet size A3. For example, when an A3-size recording sheet is often used to record an image thereon and then cut or trimmed to a B4-size sheet, a user can associate the A3-size recording sheet with the B4-size recording sheet and register it beforehand. If an A3 nobi-size recording sheet is often used to record an image thereon and then cut or trimmed to the A3 size-sheet, a user can register such association beforehand. Accordingly, the CPU 1101 can determine the size of the post-cutting recording sheet from the size of the designated recording sheet based on the table registered beforehand. In this case, in step S206, the CPU 1101 determines a B4 size as the post-cutting recording sheet size based on the first recording sheet size A3. Alternatively, the user can directly designate the post-cutting recording sheet size. In such a case, steps S203 and S204 are omitted, and then in step S206, the CPU 1101 can determine a size of the designated recording sheet as a size of the post-cutting recording sheet. If the post-cutting recording sheet size is not registered in the table (NO in step S204), or the post-cutting recording sheet size is not designated at the time of the print request, the operation proceeds to step S205.

In step S207, the controller unit 110 uses the image processing unit 1102 to execute a process for generating a two-dimensional barcode and a process for combining the two-dimensional barcode with a document image under the control of the CPU 1101. An internal operation flow of the image processing unit 1102 is illustrated with reference to FIG. 4. In the image processing unit 1102, a two-dimensional barcode generation processing unit 401 executes the process for generating the two-dimensional barcode.

The user designates information to be embedded as the two-dimensional barcode from the operation unit 7, the first PC 3, or the second PC 4 at the time of the print request. Moreover, there are cases where the information to be embedded as the two-dimensional barcode is set in the printing apparatus 1 beforehand from the operation unit 7, the first PC 3, or the second PC 4 by a user who manages the printing apparatus 1.

The information to be embedded as the two-dimensional barcode includes, for example, information for suppressing a copy output operation, information of a user who requested printing, and information of the current execution date and time at which printing is executed. The information is embedded for future reference. The two-dimensional barcode generation processing unit 401 generates the two-dimensional barcode as printable bit map data.

A print image generation processing unit 402 executes a process for generating document image for printing. In the document image generation process, a document image is converted into a printable bit map image. The document image generation process includes a process for decompressing an image if the image is compressed, and a process for generating a bitmap image by interpreting a page description language (PDL) if the image is input as the language.

A two-dimensional barcode combining processing unit 403 combines the two-dimensional barcode generated by the two-dimensional barcode generation processing unit 401 and the document image generated by the print image generation processing unit 402 as one image by a two-dimensional barcode combining process. Herein, a combining position of the two-dimensional barcode is changed based on the post-cutting recording sheet size determined in step S206.

FIG. 6 illustrates a movement of a two-dimensional barcode to the position corresponding to a post-cutting recording sheet size. In FIG. 6, a print position is moved based on the post-cutting recording sheet size, and then the two-dimensional barcode is printed in an appropriate print position. Accordingly, even if a sheet having a printed image is cut or trimmed, a two-dimensional barcode can be printed based on a post-cutting recording sheet size, thereby preventing the two-dimensional barcode from being cut. Therefore, the two-dimensional barcode can be correctly recognized when the printed sheet is read by a scanner. Consequently, the movement of the print position can surely prevent disadvantages such as a case where a printed product is copied although copying is restricted, and a case where tracking information is not read from a print product although the tracking information was embedded.

Figure 5A:
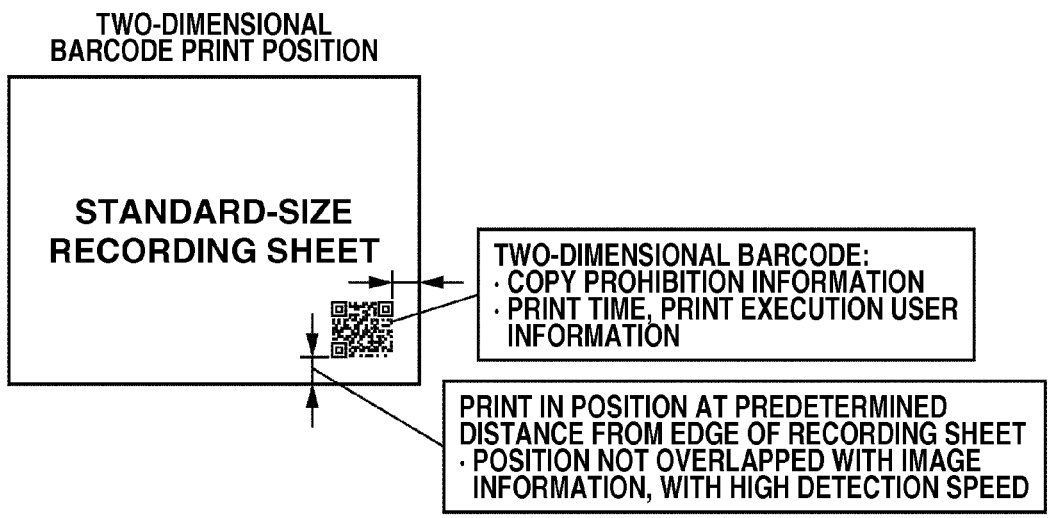
FIGS. 5A, 5B, 5C, and 5D each illustrate an example output from an image output apparatus according to the exemplary embodiment of the present invention.
Figure 5B:
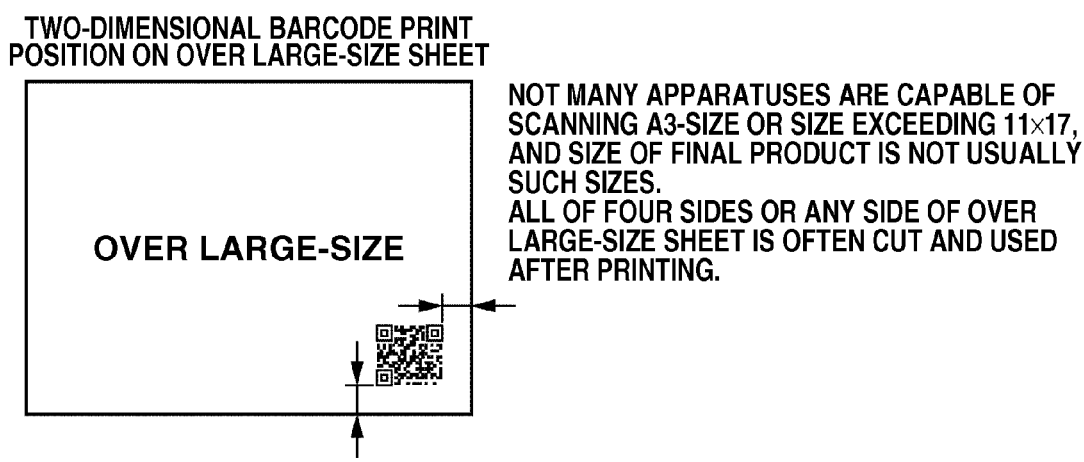
Figure 5C:
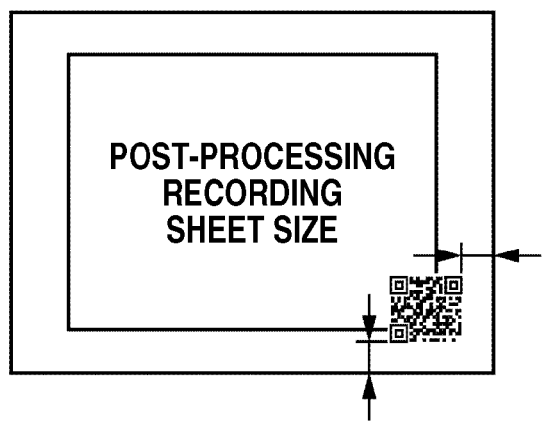
Figure 5D:
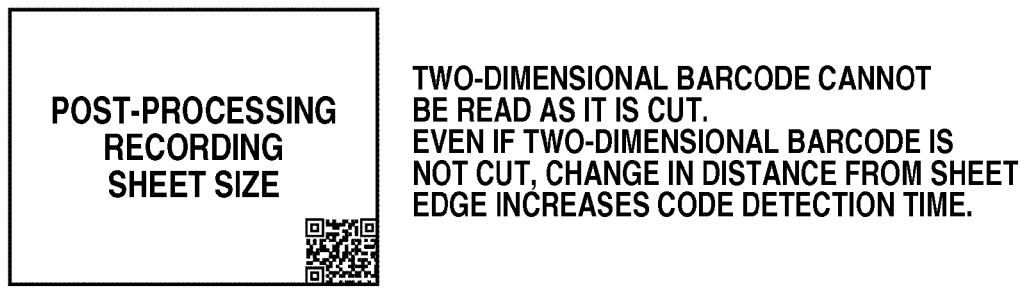

In step S205, the CPU 1101 does not cause a movement of the two-dimensional barcode based on the post-cutting recording sheet size. Since the two-dimensional barcode is not moved to a position based on the post-cutting recording sheet size as illustrated in FIGS. 5A through 5D, the two-dimensional barcode is likely to be cut including the recording sheet by the cutting operation as illustrated in FIG. 5D.

After steps S207 and S205, the CPU 1101 causes the operation to proceed to step S208. In step S208, the CPU 1101 instructs an image rotation processing unit 404 in the image processing unit 1102 to execute a rotation process on the image as needed corresponding to the recording sheet. Subsequently, the CPU 1101 causes an image transfer processing unit 405 to transfer the image to the marking unit 13 via the video bus 11132, so that printing is executed. Upon execution of printing, the operation ends. Then, the CPU 1101 instructs the sheet discharging/post-processing unit 14 to cut the image-printed recording sheet into the size determined in step S206. Upon cutting the image-printed recording sheet into the size determined in step S206, the sheet discharging/post-processing unit 14 discharges the recording sheet.

According to the present exemplary embodiment, a post-cutting recording sheet size is determined, and a combining position of a two-dimensional barcode is changed by moving thereof, so that a two-dimensional barcode image can be printed in an appropriate position for the post-cut recording sheet size. Therefore, the two-dimensional barcode can be prevented from being cut.

In the BMLinks (trademark) information marking standard specification version 1.0.0, a writing start position of the BM-IM mark is defined to be 10 mm away from an edge of a recording sheet. In an A3-size recording sheet, for example, the mark is printed within the sheet having the size of 297 mm×420 mm (height and width). Assume that a coordinate system has an origin (0,0) at upper left of the A3-size recording sheet, and the mark is normally printed in upper left of the sheet. In such a case, the mark is printed in the position at 10 mm×10 mm (height and width). However, if a post-cutting recording sheet is a B4 sheet having the size of 257 mm×364 mm, the mark can be printed in a position at 30 mm×38 mm (height and width) within the A3-size sheet.

According to the present exemplary embodiment, a printing apparatus 1 is described to determine a position of a two-dimensional barcode to be printed. However, the present invention is not limited thereto. For example, the first PC 3, the second PC 4 (information processing apparatus), or a print server (printing control apparatus) (not illustrated) may specify a post-cutting recording sheet size, to determine a print position of the two-dimensional barcode based on the specified post-cutting recording sheet size. In such a case, the first PC 3 or the second PC 4 notifies the printing apparatus 1 of the position of the two-dimensional barcode to be printed. Then, the printing apparatus 1 can generate the two-dimensional barcode and combine it with an image data. Alternatively, the first PC 3 or the second PC 4 may generate a two-dimensional barcode and combine it with image data. Then, the first PC 3 or the second PC 4 may generate print data for printing the image data having the combined two-dimensional barcode. In the present exemplary embodiment, moreover, the printing apparatus 1 is described to include the sheet discharging/post-processing unit 14. However, the present invention is not limited thereto. For example, another post-processing apparatus may execute cutting of a recording sheet. In such a case, the printing apparatus 1 can specify a size of the recording sheet cut by the post-processing apparatus, based on the post-cutting recording sheet size input by a user or a table as illustrated in FIG. 3. Moreover, in the present exemplary embodiment, a size of a post-cutting recording sheet is determined from a size of a recording sheet to be printed, and then a print position of a two-dimensional barcode is determined based on the determined sheet size. However, the present invention is not limited thereto. For example, a size of a recording sheet to be printed and a cutting amount of the recording sheet may be received from a user, so that a print position of a two-dimensional barcode may be determined based on the recording sheet size to be printed and the cutting amount received from the user. Particularly, the print position of the two-dimensional barcode can be determined such that the print position is arranged within 30 mm from an edge of a region in which a recording sheet cutting amount is removed from a size of the recording sheet to be printed, and the BM-IM mark is written from a position at a distance of 10 mm from the edge.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-193028 filed Sep. 5, 2011, which is hereby incorporated by reference herein in its entirety.

What is claimed is:

1. A printing control apparatus comprising:
    a storing unit configured to store information indicating a relationship between the size of the sheet on which an image is to be printed and the size of the sheet which has been trimmed after the image is printed thereon;
    a first obtaining unit configured to obtain a size of a sheet on which an image is to be printed;
    a second obtaining unit configured to obtain a size of a sheet which has been trimmed after the image is printed thereon by referring the information stored in the storing unit;
    a determining unit configured to determine a print position of barcode information based on the size obtained by the second obtaining unit; and
    a control unit configured to control the barcode information to be printed on the print position determined by the determining unit.

2. The printing control apparatus according to claim 1, wherein the barcode information is a two-dimensional barcode.

3. The printing control apparatus according to claim 1, wherein the barcode information is information for suppressing a copy operation, or information indicating print date and time of the barcode information.

4. The printing control apparatus according to claim 1, further comprising a trimming unit configured to trim a sheet on which an image has been printed.

5. A printing control method comprising:
    storing information indicating a relationship between the size of the sheet on which an image is to be printed and the size of the sheet which has been trimmed after the image is printed thereon;
    obtaining a size of a sheet on which an image is to be printed;
    obtaining a size of a sheet which has been trimmed after the image is printed thereon by referring the stored information;
    determining a print position of barcode information based on the obtained size of sheet which has been trimmed after the image is printed thereon; and
    controlling the barcode information to be printed on the determined print position.

6. A non-transitory computer-readable storage medium storing a computer program that causes a computer to execute the printing control method according to claim 5.

* * * * *